United States Patent [19]

Diaz

[11] Patent Number: 4,882,986
[45] Date of Patent: Nov. 28, 1989

[54] PITTING PIERCER FOR FRUIT PITTING MACHINES

[75] Inventor: Antonio G. Diaz, Sevilla, Spain

[73] Assignee: Sociedad Anomina De Racionalcion Y Mecanizacion (Sadrym), Dos Hermanas Sevilla, Spain

[21] Appl. No.: 226,764

[22] Filed: Aug. 1, 1988

Related U.S. Application Data

[63] Continuation-in-part of Ser. No. 24,326, Mar. 10, 1987, abandoned.

[30] Foreign Application Priority Data

Nov. 11, 1986 [ES] Spain .................................. 8601171

[51] Int. Cl.4 .............................................. A23N 4/00
[52] U.S. Cl. ........................................ 99/494; 99/544; 99/559; 99/565
[58] Field of Search ................. 99/494, 544, 547, 548, 99/555, 556, 557, 559–561, 565, 566

[56] References Cited

U.S. PATENT DOCUMENTS

| | | | |
|---|---|---|---|
| 1,225,838 | 5/1917 | Mai | 99/559 |
| 2,196,772 | 4/1940 | Lachman | 99/559 X |
| 4,220,080 | 9/1980 | Margaroli et al. | 99/494 |

*Primary Examiner*—Timothy F. Simone
*Attorney, Agent, or Firm*—Helfgott & Karas

[57] ABSTRACT

Fins have edges which extend forward from a body which is reciprocated back and forth by a driving rod. The fins also have cutting blades. Olives are depitted by causing the forward edges to penetrate the olives and engage the pits. The cutting blades then slice the depitted olive into separate disconnected slices.

4 Claims, 1 Drawing Sheet

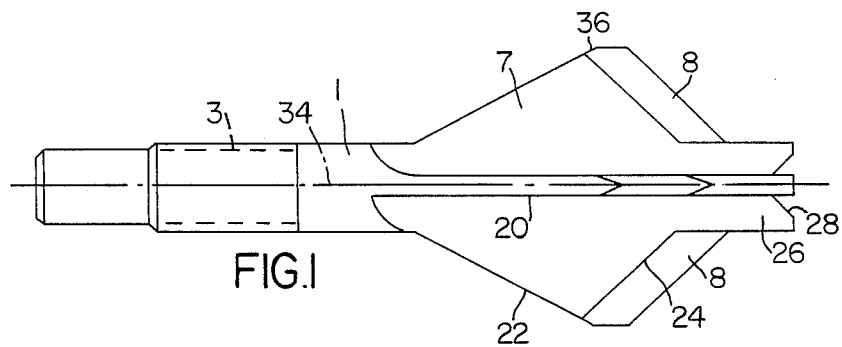
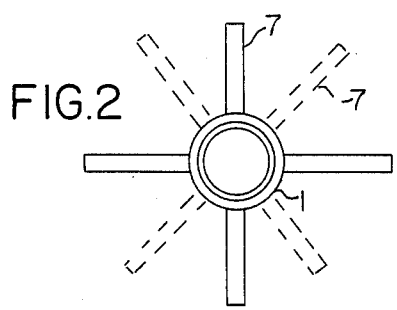
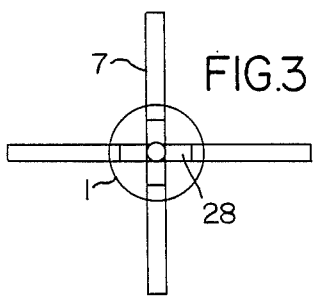
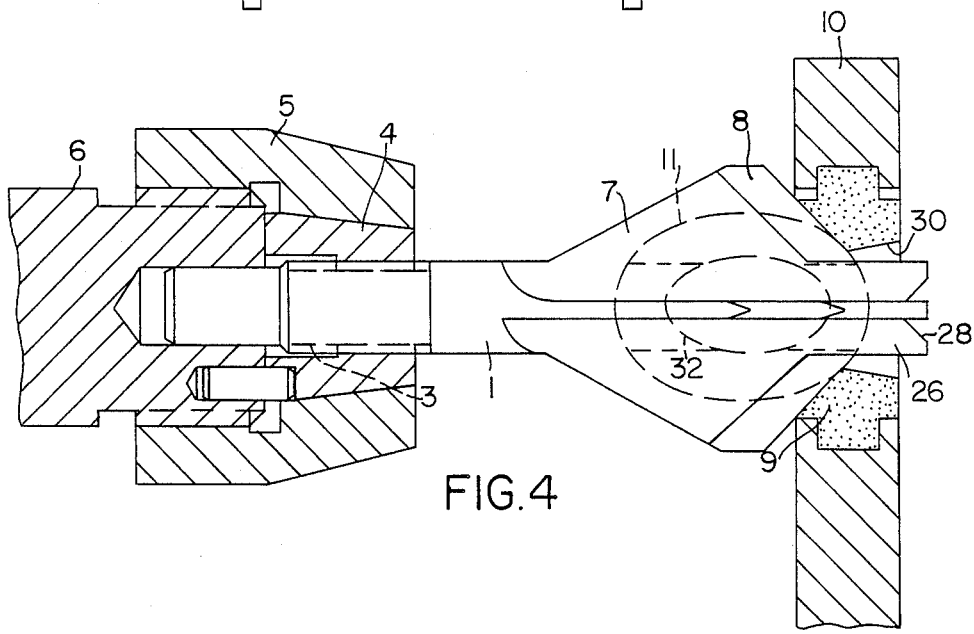

PITTING PIERCER FOR FRUIT PITTING MACHINES

CROSS REFERENCE TO COPENDING APPLICATION

This application is a continuation in-part of copending application Ser. No. 024,326 filed March 10, 1987, now abandoned.

OBJECT OF THE INVENTION

The present invention, as expressed in the title of the Specification, relates to a pitting piercer of the type used in fruit-pitting machines, such as, for example, olive pitting machines, which piercer has been improved in order to increase the operation and efficiency thereof, and to carry out cutting of the fruit in addition, and simultaneously to, the pitting thereof.

BACKGROUND OF THE INVENTION

Nowadays, automatic machines are used for pitting certain fruits, specifically olives, in which machines the olives are supplied singly and in a continuous manner to a drum wherein is established a perimetral alignment of clamps for holding the olives during the pitting operation, said clamps being provided with a bore to allow a pitting piercer to pass therethrough, and thus also through the olive, thereby tearing out and expelling the pit therefrom.

The said piercers are made up of a cylindrical shaft, the diameter whereof depends on the size of the pit, with a divided end in order to allow and facilitate cutting of the olive meat prior to reaching the pit.

Such piercers perfectly fulfil the pitting function for which they have been designed. In practice, however, the market demands that the olives be cut into pieces in addition to being pitted, so that they may be used as dressing or seasoning in certain dishes.

In order to cover this area of the market, there are currently known slicing machines to which are supplied olives which have previously been pitted, and which are then cut into slices.

This solution evidently requires two different and independent operative processes, with two very costly machines, thus resulting in a considerable increase in the cost of the end product.

DESCRIPTION OF THE INVENTION

The pitting piercer object of the invention has been designed and structured with a view to achieving that, in addition to the olive-pitting operation, it may also carry out cutting thereof, such that it simultaneously effects pitting and cutting of the olive with one single machine and in a single operative process, with no apparent increase in cost and with a productivity similar to that of a machine working exclusively as a pitter.

More specifically, and in order to achieve the above, from the conventional cylindrical shape with a divided operative end for pitting the olive or fruit in question, the basic characteristics of the piercer object of the invention are centered on the fact that it includes a plurality of radial fins immediately after said divided end, which fins are preferably triangular in shape and have a blade-like front edge such that on introducing the piercer into the olive and immediately after pitting thereof, the said olive is simultaneously cut into a number of slices or strips equal to the number of fins provided on the pitting piercer.

Thus, the number of fins of the piercer may vary in accordance with the number and size of the pieces to be obtained, said fins being nevertheless evenly distributed, i.e., equiangularly spaced around the piercer, in order that the slices obtained on cutting are all of identical size.

DESCRIPTION OF THE DRAWINGS

In order to complete the description being made, and to assist a better understanding of the characteristics of the invention, a single sheet of drawings is attached to the present specification, as an integral part thereof, wherein the following has been shown in an illustrative and non-limiting manner:

FIG. 1 is a side elevational view of a pitting piercer for fruit pitting machines in accordance with the object of the present invention.

FIG. 2 is a rear elevational view thereof.

FIG. 3 is a front elevational view.

FIG. 4 is, finally, a similar view to that of FIG. 1, showing the said piercer duly fitted in a fruit pitting machine, at its extreme working position, having finished the operation of cutting and pitting the olive (shown with a dotted line).

PREFERRED EMBODIMENT OF THE INVENTION

In the light of these figures, it can be seen how the pitting piercer object of the invention is comprised, in a conventional manner, by a cylindrical body 1 provided with the conventional divisions or faces at its operative end with which it carries out the likewise conventional pitting function, whereas its opposite end comprises a threaded section 3 for engaging bushing 4 which, with the aid of nut 5, allows definite axial fastening thereof to driving rod 6 which supplies to the piercer the alternative movement necessary for its operation.

From this basic, conventional structure, the characteristics of the piercer of the invention are centered on the fact that, immediately after its divided end, the piercer is provided with a plurality of fins 7, placed axially along their generatrixes, which fins are variable in number, are preferably triangular in shape, and have a blade-like front edge for attacking the olive meat. Each fin has a first rear section with a triangular shape, one side 20 extending along axis 34, a second side 22 extending forwardly and radially outward to an apex 36, and a third side 24 extending forwardly and radially inward from the apex 36 to a second forward section 26. The third side 24 has an exposed cutting blade 8. The second section has a forward edge 28 which extends inclinedly rearwardly and radially inwardly toward the axis.

More specifically, in the practical embodiment shown in the figures, there are provided four cutting fins 7, but this number may obviously vary at will, to either increase or decrease, depending on the number of pieces to be obtained from the olive, said fins 7 nevertheless adopting an even distribution around the periphery of body 1 of the piercer. Thus, obviously if there are two fins established diametrically on the cylindrical body 1, the olive or fruit in question will be cut into two equal pieces; if there are three fins, three pieces will be obtained, and so on, the pieces obtained being identical in each case.

In accordance with this structure, and as shown in FIG. 4, the olives reach the working area of piercer 1 resting on the clamp, seat or holder 9, which in turn is situated on a conventional support disc 10, the divided end 2 of the body attacks the olive 11 and, once having cut through the meat of the olive in the direction of its major axis, abuts the pit dislodging and withdrawing same towards the outside, the pit being expelled through the inner bore of seat 9. In its position of maximum axial forward displacement shown in FIG. 4, the pitting piercer will not only have ensured complete withdrawal of the pit, but the blade-like edges 8 of fins 7 will furthermore have reached the front of seat 9 and the olive will thus have been simultaneously cut into a certain number of pieces or slices in addition to having been pitted, the number of slices obtained being the same as the number of cutting fins 7 of the piercer.

In this way, and in accordance with the object of the invention, cutting of the olive is obtained simultaneously to pitting thereof with the use of a conventional pitting machine, it being simply necessary to substitute conventional piercers for the pitting pierce described in the invention.

Thus, in accordance with applicant's invention, apparatus for depitting and cutting olives into slices in an olive pitting machine is provided with an elongated driving rod which is actuated in reciprocating motion to be moved backwardly and forwardly along its axis between an extreme rear position and an extreme forward position, said rod having a free end designated as a driving end. An elongated generally cylindrical body has first and second opposite ends and has an axis coincident with the rod axis, the first end of the cylinder being connected to the driving end of the rod whereby the body is moved backwardly and forwardly along the axis by the corresponding movement of the rod. First means for depitting and cutting an olive into slices is constituted by a plurality of spaced thin elongated fins which are integral with the second end of the body and extend forwardly of the body in the axial direction. Each fin has a first rear section with a triangular shape, one triangular side of the first section extending along the axis, a second triangular side extending forwardly and radially outward to an apex, a third triangular side extending forwardly and radially inward form the apex to a second forward section. The second section extends forwardly and parallel to the axis. The third side has an exposed cutting blade. The second section has a forward edge which extends inclinedly rearwardly and radially inwardly toward the axis. Second means includes an olive holder provided with a bore axially aligned with the axis and lying in a plane perpendicular to the axis for supporting an olive having a major axis aligned with the axis. The olive has a rear end disposed in the bore and a front end, the front end of the olive being spaced from the front edges of the second sections when the rod is in its extreme rear position. The front edges of the second sections penetrate the olive to engage the pit and depit the olive as the rod moves into its extreme forward position. The cutting blades of the third sides of the first sections slice the depitted olive into a like plurality of separate slices disconnected from each other.

The first means for depitting and cutting an olive into slices is constituted by a plurality of spaced thin elongated fins (7) which are integral with the second end of the body (1) and extend forwardly of the body in the axial direction. Each fin has a first rear section with a triangular shape, one triangular side (20) of the first section extending along the axis (34), a second triangular side (22) extending forwardly and radially outward to an apex (36) and a third triangular side (24) extending forwardly and radially inward from the apex to a second forward section (26) which extends forwardly and parallel to the axis. The third side having an exposed cutting blade (8). The second section (26) has a forward edge (28) which extends inclinedly rearwardly and radially inwardly toward the axis.

The second means includes an olive holder (9) provided with a bore (30) axially aligned with the axis lying in a plane perpendicular to the axis for supporting an olive (11) having a major axis aligned with the axis. The olive has a rear end disposed in the bore and a front end. The front end of the olive is spaced from the front edges of the second sections when the rod is in its extreme rear position. The front edges (28) of the second sections penetrate the olive (11) to engage the pit (32) to depit the olive as the rod moves into its extreme forward position. The cutting blade (8) of the third sides of the first sections slice the depitted olive into a like plurality of separate slices disconnected for each other.

It is not considered necessary to extend this description for a person skilled in the art to understand the scope of the invention and the advantages derived therefrom.

The materials, shape, size and arrangement of the elements may vary, provided this does not imply a change in the essentiality of the invention. The number of fins 7 may vary depending on the number of pieces or slices to be obtained from the olive, as shown in FIG. 2 in dotted lines.

The terms used in the description of the present specification should be understood in a wide and nonlimiting meaning.

What is claimed is:

1. Apparatus for depitting and cutting olives into slices in an olive pitting machine, said apparatus comprising:

an elongated driving rod which is actuated in reciprocating motion to be moved backwardly and forwardly along its axis between an extreme rear position and an extreme forward position, said rod having a free end designated as a driving end;

an elongated generally cylindrical body having first and second opposite ends and having an axis coincident with the rod axis, the first end of the cylinder being connected to the driving end of the rod whereby the body is moved backwardly and forwardly along the axis by the corresponding movement of the rod;

first means for depitting and cutting an olive into slices, said means being constituted by a plurality of spaced thin elongated fins which are integral with the second end of the body and extend forwardly of the body in the axial direction, each fin having a first rear section with a triangular shape, one triangular side of the first section extending along the axis, a second triangular side extending forwardly and radially outward to an apex, a third triangular side extending forwardly and radially inward from the apex to a second forward section which extends forwardly and parallel to the axis, the third side having an exposed cutting blade, the second section having a forward edge which extends inclinedly rearwardly and radially inwardly toward the axis; and second means including an olive holder provided with a bore axially aligned with the axis lying in a plane perpendicular to the axis for supporting an olive having a major axis aligned with the axis, the olive having a rear end disposed in the bore and a front end, the front end of the olive being spaced from the front edges of the second sections when the rod is in its extreme rear position, the front edges of the second sections penetrating the olive to engage the pit to depit the olive as the rod moves into its extreme forward position, the cutting blades of the third sides of the first sections slice the depitted olive into a like plurality of separate slices disconnected for each other.

2. Apparatus as set forth in claim 3 wherein the fins are equidistantly spaced about the axis and the slices are all of the same size.

3. Pitting piercer for fruit pitting machines, and specifically for olive-pitting machines, the piercer comprising a body provided at one end thereof with means for axial coupling thereof to a corresponding driving rod of the machine, and fruit-depitting and cutting means at another end thereof, said fruit depitting and cutting means including a plurality of spaced thin elongated fins formed on said another end and extending radially from and forwardly of said body in an axial direction thereof, each fin having a first rear section of a triangular shape, one triangular side of the first section extending along the axis, a second triangular side extending forwardly and radially outward to an apex, a third triangular side extending forwardly and radially inward from the apex to a second forward section which extends forwardly and parallel to the axis, a third side having an exposed cutting blade, the second section having a forward edge which extends inclinedly rearwardly and radially inwardly toward the axis, whereby, on abutting the fruit held at an annular seat, the forward edges of the second sections of the fins penetrate the fruit to engage the pit to depit the fruit as said one end is moved by said driving rod to its extreme forward position and the cutting blades of the third triangular sides of the first sections of the fins slice the depitted fruit into a like plurality of separate slices.

4. Pitting piercer for fruit pitting machines, in accordance with claim 3, wherein the number of said fins may vary depending on the number of slices to be obtained from each fruit, said body being a cylindrical shaft, said fins being positioned on respective generatrixes of the cylindrical shaft and being equidistantly spaced about said shaft to ensure that the slices obtained on cutting the fruit are all of the same size.

* * * * *